United States Patent [19]

Dickinson et al.

[11] Patent Number: 5,588,109
[45] Date of Patent: Dec. 24, 1996

[54] USER INTERFACE FOR A REMOTE DIAGNOSTIC DEVICE

[75] Inventors: Ian J. Dickinson, Wilmington, Del.; Horst Eichberger, Karlsbad, Germany; David W. Messaros, Wallingford, Pa.; Hans-Dieter Walter, Ditzingen, Germany

[73] Assignee: Hewlett-Packard Company, Palo Alto, Calif.

[21] Appl. No.: 376,720

[22] Filed: Jan. 23, 1995

[51] Int. Cl.⁶ .................. G06F 3/00; G06F 3/14
[52] U.S. Cl. ...................... 395/326; 395/340
[58] Field of Search .................. 395/155–161, 395/183.03

[56] References Cited

U.S. PATENT DOCUMENTS

| | | | |
|---|---|---|---|
| 4,434,489 | 2/1984 | Blyth | 371/29 |
| 5,023,817 | 6/1991 | Au et al. | 364/550 |
| 5,124,908 | 6/1992 | Broadbent | 395/161 X |
| 5,224,055 | 6/1993 | Grundy et al. | 364/488 |
| 5,245,324 | 9/1993 | Jonker et al. | 345/134 |
| 5,375,199 | 12/1994 | Harrow et al. | 395/159 |
| 5,420,977 | 5/1995 | Sztipanovitz et al. | 395/160 |
| 5,504,863 | 4/1996 | Yoshida | 395/184 |
| 5,517,607 | 5/1996 | Nishimura et al. | 395/160 |

OTHER PUBLICATIONS

Knapp, P., "Digital Maintenance Information (DMI) system," Autotestcon '89, pp. 138–145.

Primary Examiner—Raymond J. Bayerl
Assistant Examiner—A. Katbab
Attorney, Agent, or Firm—Richard F. Schuette

[57] ABSTRACT

The invention is a diagnostic tool for providing remote diagnosis of instrument operation by graphically depicting an instrument, instrument variables and their corresponding values on a plurality of interrelated windows displayed on a computer screen. The computer communicates with the instrument to obtain signals for continuously updating the information displayed on the windows.

19 Claims, 8 Drawing Sheets

USER INTERFACE FOR A REMOTE DIAGNOSTIC DEVICE

FIELD OF THE INVENTION

The present invention relates to methods and apparatus for interfacing a user to an instrument and, more particularly, to a user interface for a remote diagnostic device for providing a graphical display of instrument configuration, components, variables and setpoints.

BACKGROUND OF THE INVENTION

Product support and service typically involves sending a customer engineer to a customer site to service a product. Once on-site, the customer engineer will attempt to ascertain or diagnose the problem which led to the visit and implement a repair. Remote support and service may be accomplished over the telephone through a series of questions and answers between the customer and the customer engineer. Unfortunately, the problem described by the customer is not always the actual problem, and quite often, the customer can not give answers to questions from the customer engineer. The foregoing results in an unhappy customer and a frustrated customer engineer.

There exists a need for a remote diagnostics tool which reduces the cost of providing service and support to customers. Since a portion of all service calls do not require the replacement of hardware, it would be desirable to provide for service calls without an on-site visit by a customer engineer. For example, there would be savings of both time and money if service requests could be handled from a centralized location by a remote diagnostics tool over standard telephone lines.

It would be desirable and of considerable advantage to provide a diagnostic tool having an easy to use graphical interface which provides for continuous remote monitoring and modification of selected instrument variables. Furthermore, it would be advantageous if such an interface could also provide automated access to signals generated by the instrument to update the graphical interface with the current configuration of the instrument and the identity of current instrument variables and their output values.

SUMMARY OF THE INVENTION

The present invention is a diagnostic tool employing a graphical user interface in which a graphical representation of an instrument is depicted and continuous monitoring of instrument variables are provided to enhance remote instrument diagnosis and repair.

Accordingly, a computer executes a software application program to generate a graphical user interface, as well as to set up communication between the computer and the instrument. The computer includes a display screen having a plurality of windows for displaying the graphical user interface. An instrument schematic window provides a graphical depiction of the instrument, wherein individual instrument components may be accessed for increasing the level of detail of the instrument schematic being displayed. An instrument variables window is employed for displaying continuously updated instrument output values corresponding to the displayed instrument components. A memo pad window is employed for displaying selected instrument variables and their corresponding output values even though they may not be currently displayed on the instrument schematic, as well as notes and comments. Finally, a tool bar window is employed which comprises a plurality of graphical icons for accessing diagnostic operations available for execution on the computer.

The present invention may also be adapted in certain embodiments to provide a method and apparatus for on-site diagnosis and repair whereby the graphical user interface is executed on a computer coupled directly to the instrument and not over standard phone lines.

Other aspects and advantages of the present invention will become apparent from the following detailed description, taken in conjunction with the accompanying drawings, illustrating by way of example the principles of the invention.

DETAILED DESCRIPTION OF THE PREFERRED EMBODIMENTS

The invention is a diagnostic tool which employs a graphical user interface with a plurality of interrelated windows for providing a graphical depiction of an instrument, instrument variables and their corresponding output values. The invention provides for continuous remote monitoring of the instrument and selected instrument variables to enhance remote instrument diagnosis and repair.

Figure 1:
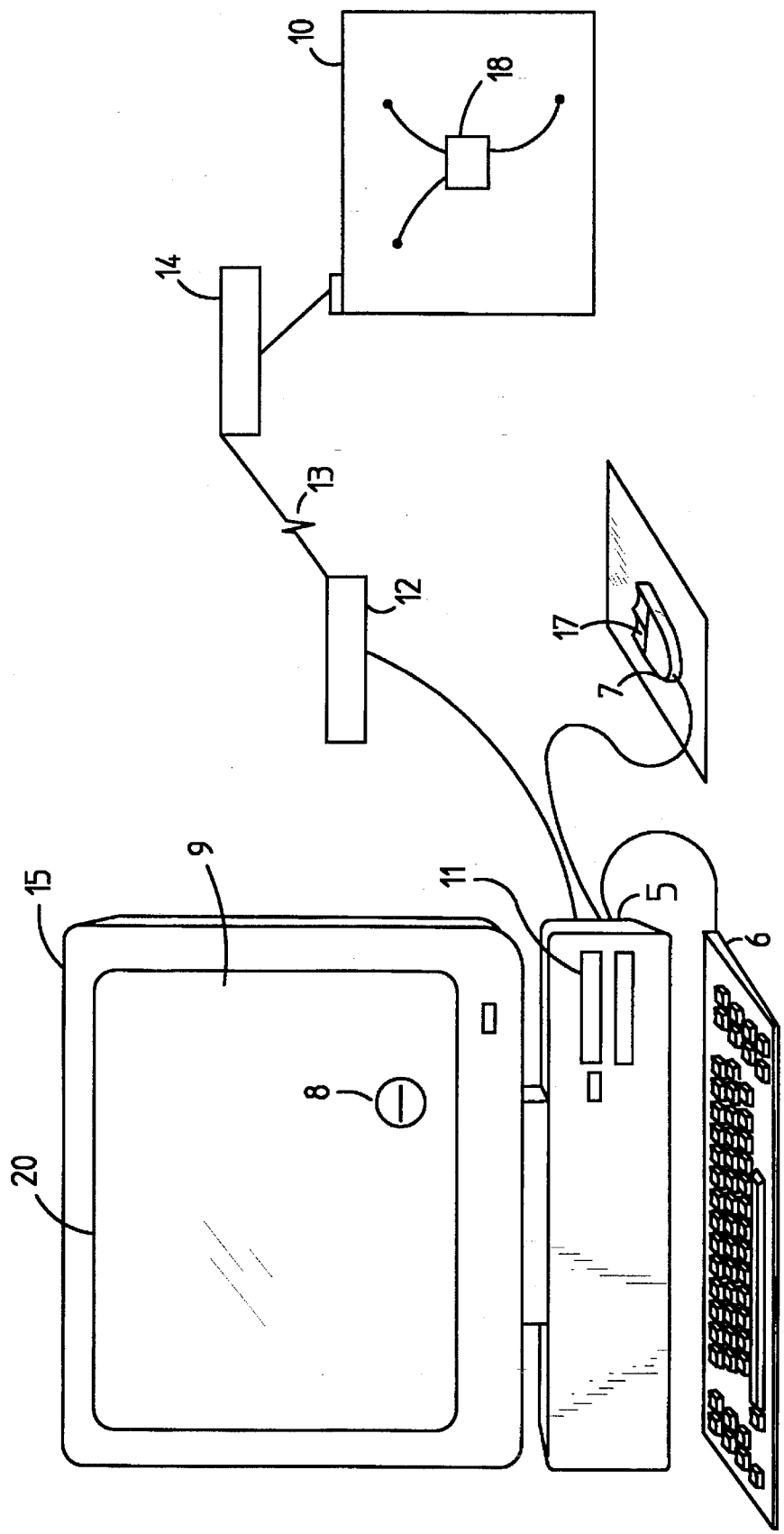
FIG. 1 is a schematic representation of a remote computer coupled to an instrument, the computer displaying the preferred embodiment of the graphical user interface for a remote diagnostic tool.

In accordance with a first aspect of the present invention, FIG. 1 depicts a computer 5 including a keyboard 6 and an input device 7 for moving a cursor 8 around the screen display 9. The computer 5, having a Micrsoft Corporation Windows operating system, executes a software application program 11 written in the Visual Basic programming language to generate a graphical user interface 20 on the screen display 9 and to perform remote diagnostics and repair of the instrument 10. While the computer employed in the preferred embodiment is commonly referred to as a PC, other types of personal computers and workstation running other forms of "Windows" based operating system or the like may be employed.

An enter button 17 on the input device 7 is employed for accessing information or data highlighted by the cursor. While the disclosed input device 7 is typically referred to as a mouse, trackballs and other known input devices may otherwise be employed. A first modem 12 and a second modem 14 enable data transfer between the computer 5 and the instrument 10 over a standard telephone line 13. The diagnostic tool monitors control signals generated by the instrument 10 to provide periodic updates of instrument operating values on the display 9. Sensors 18 within the instrument 10 provide instrument configuration signals which are employed by the diagnostic tool for automatically displaying the current configuration of the instrument components and the connections between the components.

Figure 2:
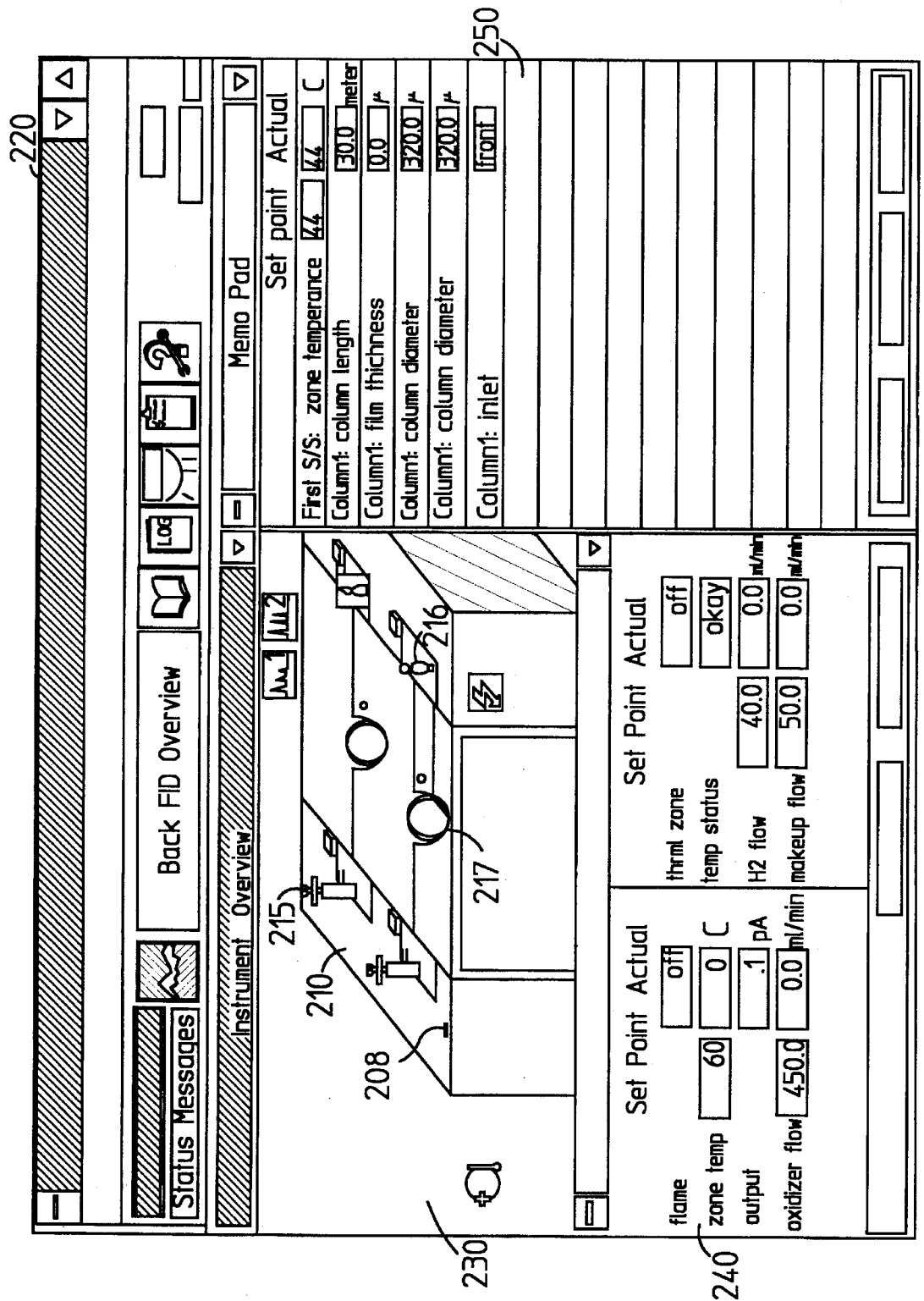
FIG. 2 depicts the graphical user interface depicted in FIG. 1 illustrating a top level view of an instrument schematic window, an instrument variables window and a memo pad window.

Once connected, the user is presented with a top level view on display 9 as illustrated in FIG. 2 in which the graphical user interface 220 comprises an instrument schematic window 230 depicting a top level view of the instrument, an instrument variables window 240 which identifies a corresponding level of instrument variables and associated instrument values, and a memo pad window 250 for tracking selected instrument variables.

Instrument variables corresponding to individual components depicted on the instrument schematic may be accessed in more detail by moving the cursor to highlight the component and depressing the enter button 17 on the input device 7 depicted in FIG. 1. A more detailed view of the highlighted component may be obtained by depressing the enter button 17 a second time which also updates the instrument variables window 240 with the corresponding instrument values at a level of detail represented by the detailed view.

A cursor 208 may be moved around the graphical depiction of the instrument 210 and its associated components (inlets 215, detectors 216, columns 217) through the use of an input device 7 (FIG. 1). As the cursor is moved to an instrument component, the computer 5 communicates to the instrument and requests the current instrument variables, setpoints and current values for that particular component such that they may be displayed on an instrument variables window 240. A memo pad window 250 gives the user the ability to view and monitor selected instrument variables (like taking notes on a memo pad) even if they are not currently being displayed on the instrument schematic 230. Variables may be placed on the memo pad by moving the cursor to the variable name and depressing the enter button. The memo pad also allows the user to edit instrument variable setpoints.

Figure 3:
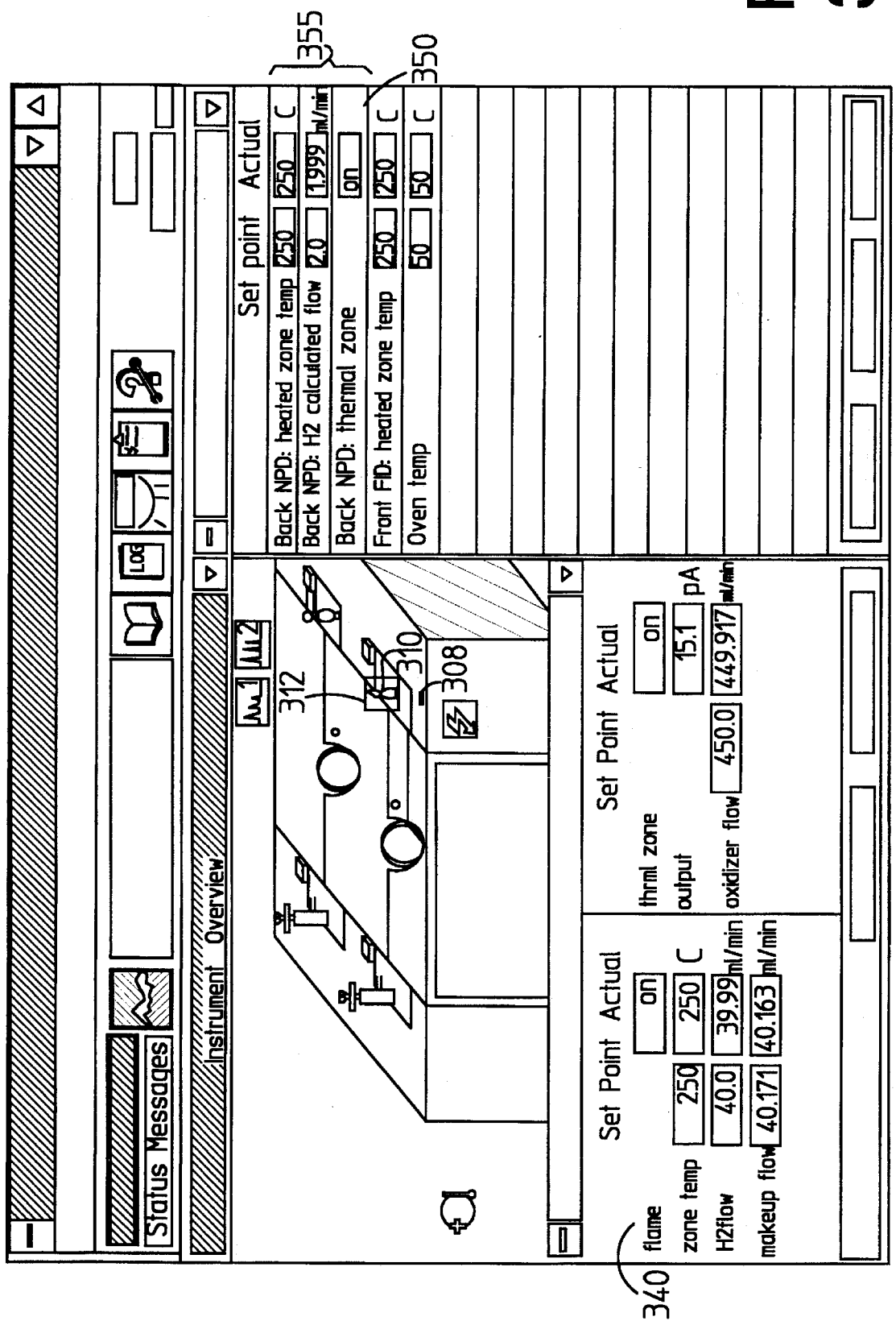
FIG. 3 depicts the graphical user interface as set forth in FIG. 2 in which the FID is highlighted in a box, as well as the corresponding FID instrument variables on both the instrument variables window and the memo pad window.

FIG. 3 illustrates a more detailed view of the graphical user interface 220 depicted in FIG. 2, in which a graphical depiction of an FID 310 is highlighted within a box 312 by moving the cursor 308 over the FID 310 and depressing the enter button 17 on the input device 7 depicted in FIG. 1. Variables associated with the FID 310 are illustrated in the instrument variables window 340. The memo pad window 350 includes a number of instrument variables 355 (related to the NPD) that have been identified for display even though they are not currently being displayed on the instrument variables window 340.

Figure 4:
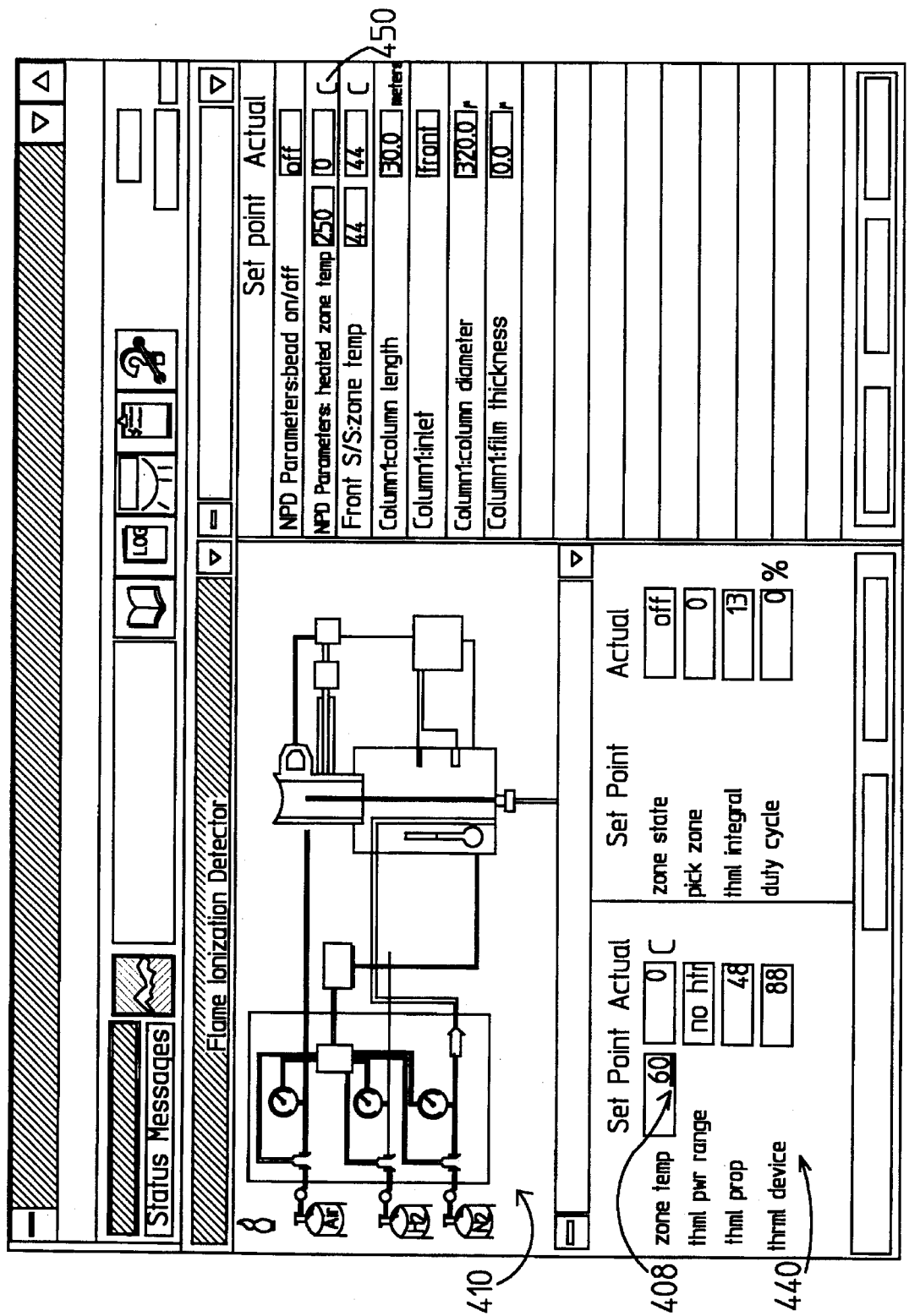
FIG. 4 depicts the graphical user interface providing detailed FID information.

Depressing the enter button 17 on the input device 7 (FIG. 1) a second time while the cursor 308 (FIG. 3) is highlighting the FID 310 causes the computer as illustrated in FIG. 4, to display a detailed schematic of the FID 410 in the instrument schematic window 430. The instrument variables window 440 automatically updated with a detailed listing of the corresponding FID 310 instrument values (the computer 5 sends instructions to the instrument requesting that such information be provided).

The name and value of an instrument component on the instrument variable display 440 may be copied onto the memo pad window 450 by moving the cursor 408 to the desired instrument variable and depressing the enter button on the input device. Instrument values will be maintained on the memo pad 450 even if they are deleted from the instrument variables window 440. By using the memo pad 450, the user can identify specific instrument variables for extended monitoring. In addition, notes, reminders or messages may be added to the memo pad 450.

Figure 5:
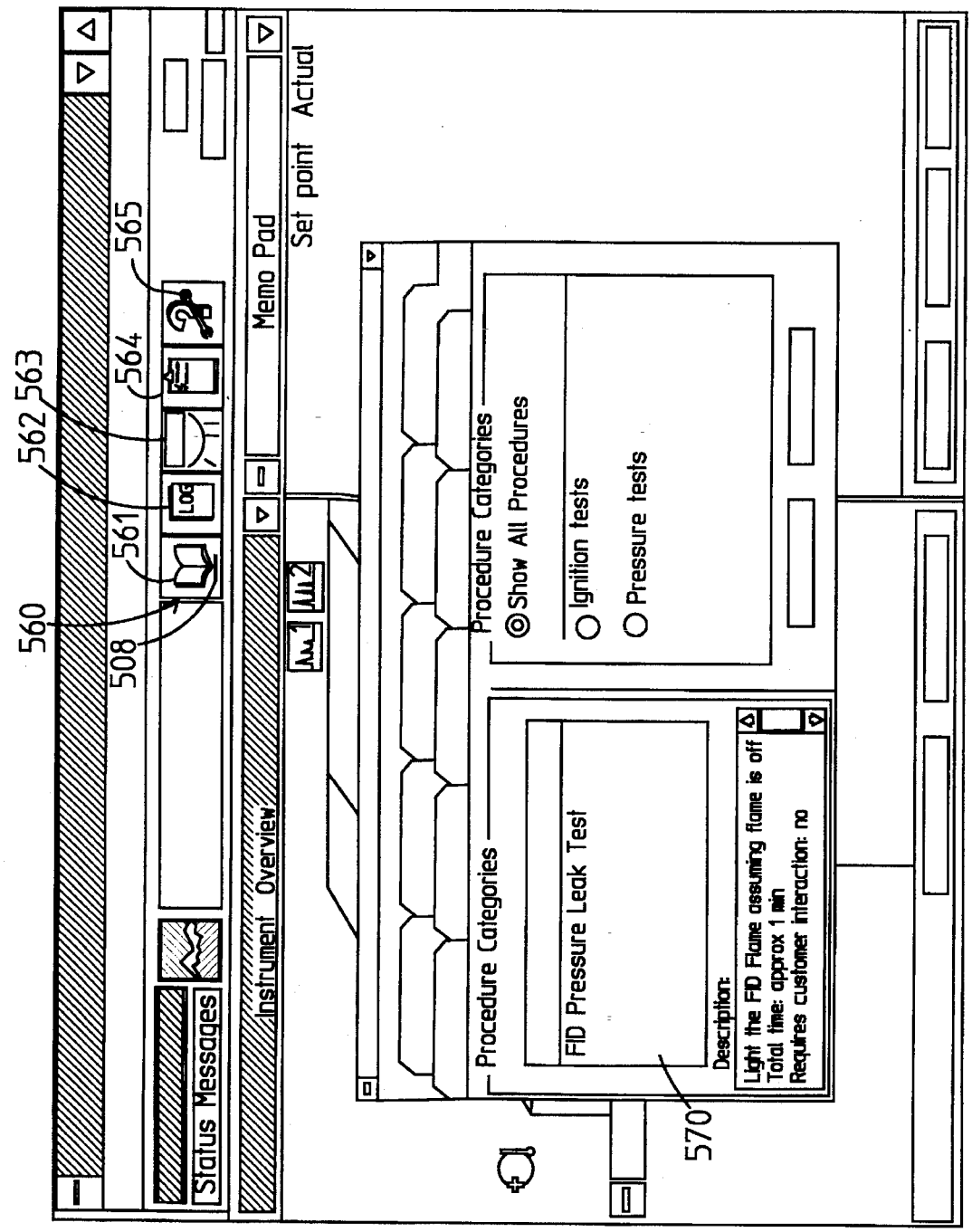
FIG. 5 depicts a graphical user interface as set forth in FIG. 1 upon actuation of the clipboard icon.

FIG. 5 illustrates the graphical interface having a tool bar window 560 including a plurality of icons representing a plurality of instrument operations which may be accessed by the user to perform diagnostics. The icons include a lab notebook icon 561, a log book icon 562, a front panel icon 563, a clipboard icon 564, and a question mark icon 565. Instrument operations may be accessed by moving the cursor 508 into position over a desired icon and depressing the enter button 17 on the input device 7 (FIG. 1). For example, accessing the clipboard icon 564 generates an icon window 570 illustrating the tests which are available for diagnosis of that portion of the instrument highlighted in the instrument schematic 530 (partially obscured by the icon window 570). The status bar icon 563 may be employed for displaying the status of the diagnostic session (ie. modem connection status, connect time, general status messages and specific cursor location hints).

Accessing the clipboard icon 564 brings up a clipboard window 570 in the form of a test clipboard over the instrument schematic window 530 and instrument variables window 540. The clipboard window 570 displays a top level view of a list of procedures and available procedure categories. Pressing the enter button 17 on the input device 7 (FIG. 1) a second time while the cursor is over a selected component in the instrument schematic will result in a listing of all the manual tests associated with the selected component. The user can select a test to run by moving the cursor 508 to the test name and depressing the enter button 17.

Figure 6:
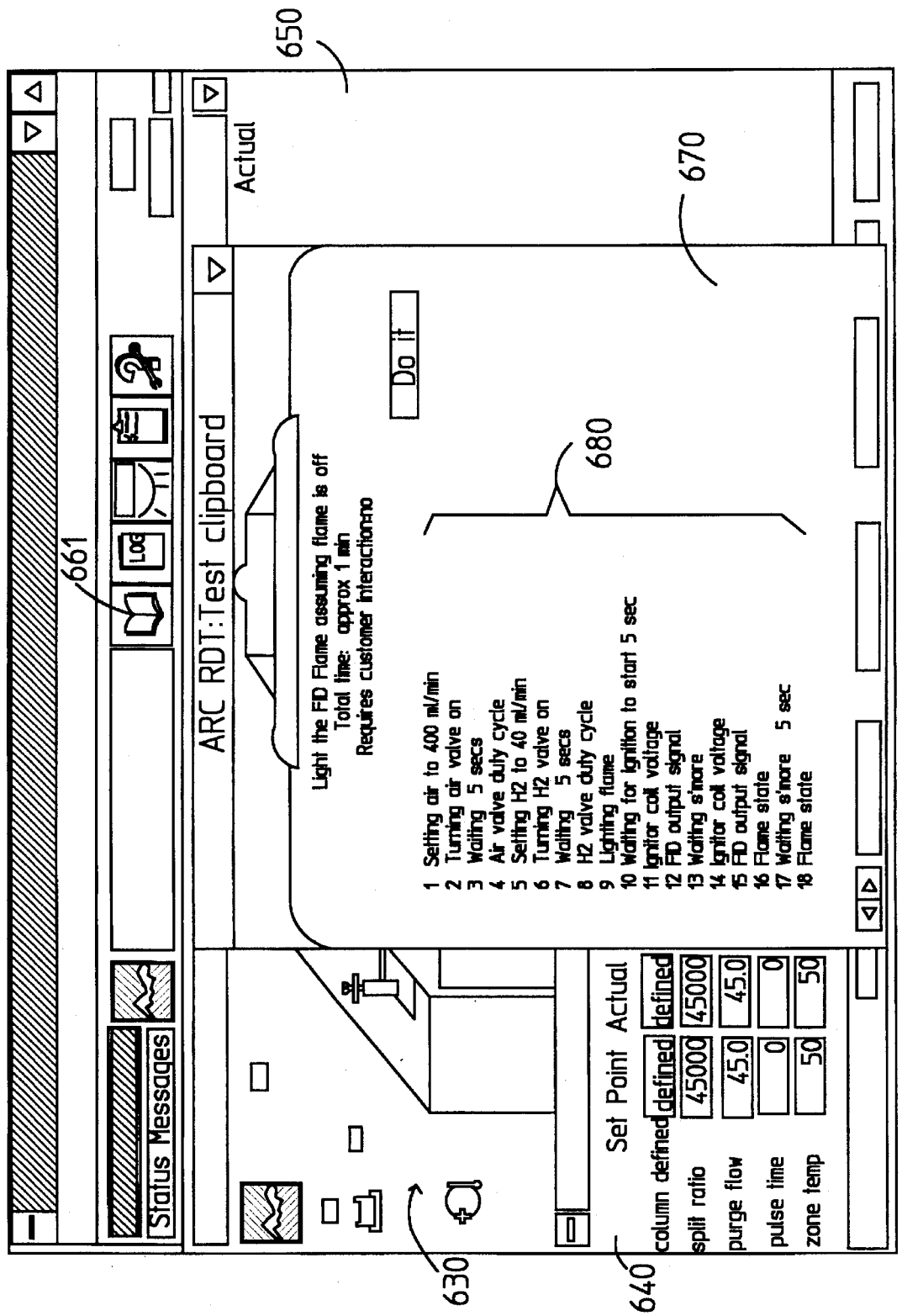
FIG. 6 depicts a more detailed version of the clipboard window set forth in FIG. 5.

For example, FIG. 6 depicts the graphical user interface 20 when the user accesses the test clipboard 670 after highlighting the FID (not shown) in the instrument schematic 630. For example, the test clipboard 670 may be employed for assisting the user in the process steps 680 required for testing the lighting of the FID flame and displays the results of the completed tests. The text on the clipboard 670 changes dynamically as the user works through the steps of the test.

The lab notebook icon 661 represents the diagnostic history database. The diagnostic history database stores diagnostic information. The diagnostics tool will automatically store the instrument configuration, status and method information for every instrument connection. Values from both the instrument variable window 640 and the memo pad window 650 can be copied into the laboratory notebook, placing this information into the diagnostic history database, by moving the cursor to the desired instrument variable and depressing the enter button 17 on the input device 7.

Figure 7:
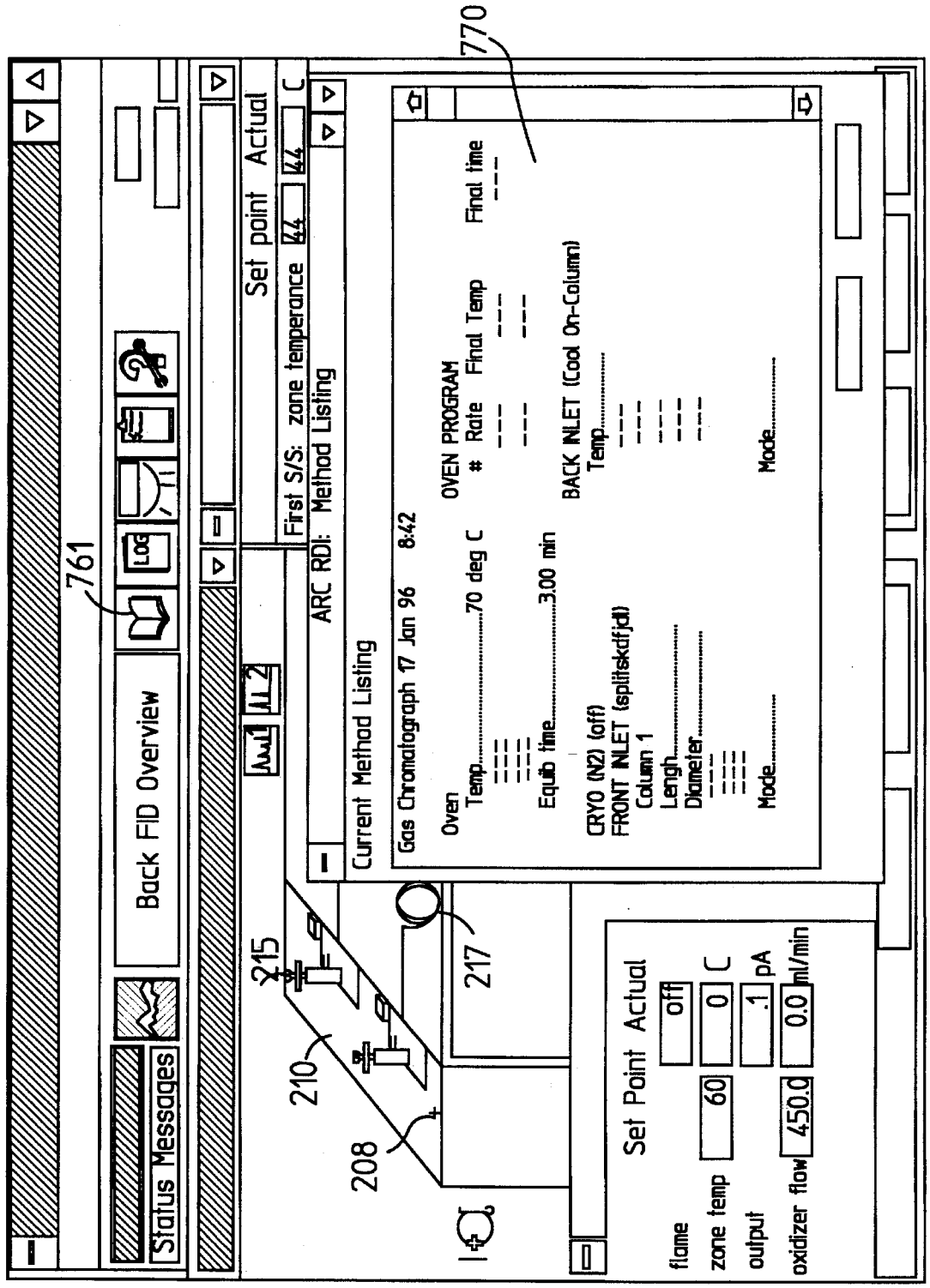
FIG. 7 depicts a graphical user interface as set forth in FIG. 1 upon actuation of the lab notebook icon.

FIG. 7 depicts the graphical user interface 20 when the lab notebook icon 761 is selected. In particular, a listing the instrument method setpoints 770 is displayed. Since this is a read only display, the user cannot change variables on this form.

Figure 8:
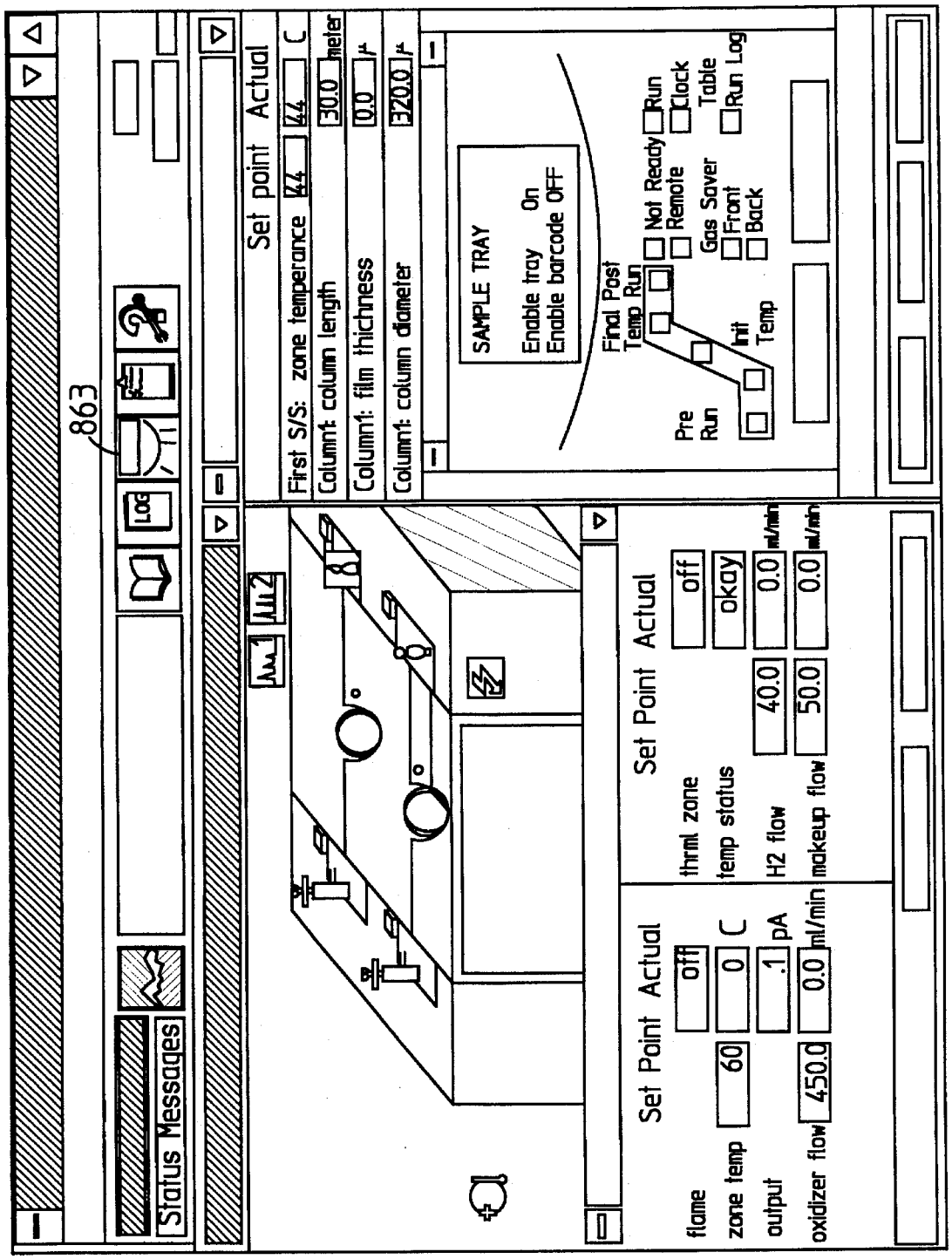
FIG. 8 depicts a graphical user interface as set forth in FIG. 1 upon actuation of the front panel icon.

FIG. 8 depicts the graphical user interface 20 when the front panel icon 863 is accessed. In particular, a representation of the front panel of the instrument is displayed, including an alphanumeric display which indicates the current method setpoints, as well as various status lights reflecting instrument status.

The diagnostic tool provided by the invention enhances remote diagnosis and repair of an instrument by graphically depicting the instrument, instrument variables and their corresponding values, all of which are continuously updated by providing a communication link between a computer executing a software application program and the instrument which makes available signals representing the instrument variables and values. While the invention has been described and illustrated with reference to specific embodiments in the area of gas chromatography, skilled in the art will recognize that modification and variations may be made such that the invention is equally applicable to the remote sensing of any type of instrument which has the ability to generate signals which can be communicated to a computer capable of executing the inventive diagnostic tool.

What is claimed is:

1. An apparatus for remote diagnostics of an instrument, comprising;

a computer for executing a software application program which provides for communication of commands from the computer to the instrument, and the communication of information accessed from the instrument in response to the commands, the computer further comprising:

a graphical user interface comprising a plurality of interrelated windows for displaying the accessed information, wherein, displaying information in one window effects the display of information in at least one other window, the interrelated windows further comprising:

an instrument schematic window providing a graphical depiction of the instrument in which the instrument is the combination of a plurality of components, each of which may be accessed individually, an instrument variables window for displaying the current output value of the accessed components;

a memo pad window for displaying those output values of the accessed components which have been identified for continuous review even though they may not be currently displayed in the instrument schematic window.

2. The apparatus as claimed in claim 1, further comprising a toolbar window having a plurality of graphical icons representing available diagnostic operations, wherein, a particular diagnostic operation is selected by accessing the corresponding icon.

3. The apparatus as claimed in claim 2, said graphical icons further comprising a clipboard for listing the tests for a component, a lab notebook for accessing instrument diagnostic history, and a book for determining method information.

4. The apparatus for remote diagnostics of an instrument, as claimed in claim 1, further comprising a status bar for displaying the status of the diagnostic session.

5. The apparatus for remote diagnostics of an instrument, as claimed in claim 4, wherein the status bar displays the modem connection status, the connect time status, general status messages and specific cursor location.

6. The apparatus for remote diagnostics of an instrument, as claimed in claim 1, wherein, the computer requests information from the instrument which describes the configuration of the instrument and in response, the computer displays a graphical depiction of the instrument on the instrument schematic window.

7. The apparatus for remote diagnostics of an instrument, as claimed in claim 6, the display further comprising a cursor, and the computer further comprising an input device for moving the cursor around the display.

8. The apparatus for remote diagnostics of an instrument, as claimed in claim 7, wherein, the user moves the cursor over a component of the instrument in the instrument schematic window and the computer will automatically display the corresponding instrument variables and their values in the instrument variables window.

9. The apparatus for remote diagnostics of an instrument, as claimed in claim 7, wherein, instrument variables are inserted onto the memo pad by moving the cursor over a component of the instrument and depressing the enter button, and then moving the cursor to the memo pad window and depressing the enter button a second time.

10. A method for interfacing a computer having a display, a cursor and an input device for moving the cursor, to an instrument such that the user can perform diagnostics and repair, comprising the method steps of:

executing a software application on the computer to provide a graphical user interface having a plurality of interrelated windows, in which accessing information in one window effects the display of information in at least one other window, the interrelated windows further comprising:

an instrument schematic window providing a graphical depiction of the instrument in which individual components forming the instrument may accessed, an instrument variables window for displaying the current output value of the accessed components;

a memo pad window for displaying those output values of the accessed components which have been identified for continuous review even though they may not be currently displayed in the instrument schematic window, connecting the computer to the instrument such that information related to instrument setup, operating parameters and operating values are communicated to the computer and displayed in the corresponding windows.

11. The method as claimed in claim 10, the step of connecting the computer to the instrument further comprises the steps of:

obtaining output signals from the instrument which describe the installed options and connectivity of the components, and adapting the instrument schematic window to show a graphical depiction of the instrument and components.

12. The method claim as claimed in claim 11, the step of accessing a plurality of icons, further comprising the step of highlighting a laboratory notebook icon, wherein, the interface searches and displays the contents of a diagnostic history database.

13. The method claimed in claim 10, further comprising the method step of:

accessing a graphical object on the computer screen corresponding to a component of the instrument in which diagnostic information is desired by using the input device to move the cursor over the graphical object and then depressing the enter button on the input device, updating the instrument variables window with those instrument values related to the component represented by the assessed graphical object.

14. The method claimed in claim 13, wherein the updated values are in a level of detail corresponding to the level of the highlighted component.

15. The method claimed in claim 14, further comprising assessing a more detailed view of a selected instrument component and associated variables by depressing the enter key on the input device a second time while the cursor is on the selected instrument component.

16. The method claimed in claim 10, further comprising the steps of:

selecting an instrument test mode in which the computer lists all of the manual tests that can be run to give information about the component.

17. The method claimed in claim 16, wherein said step of selecting an instrument test mode further comprising the step of highlighting a clipboard icon.

18. The method claimed in claim 10, further comprising the step of:

highlighting selected instrument variables on the display, copying the selected variables to the memo pad window, monitoring continuously those values on the memo pad window.

19. The method claimed in claim 18, further comprising the step of:

adding notes, reminders or messages to the memo pad window.

* * * * *